(12) United States Patent
Rajwar et al.

(10) Patent No.: US 8,996,845 B2
(45) Date of Patent: Mar. 31, 2015

(54) VECTOR COMPARE-AND-EXCHANGE OPERATION

(75) Inventors: Ravi Rajwar, Portland, OR (US); Andrew T. Forsyth, Kirkland, WA (US)

(73) Assignee: Intel Corporation, Santa Clara, CA (US)

( * ) Notice: Subject to any disclaimer, the term of this patent is extended or adjusted under 35 U.S.C. 154(b) by 749 days.

(21) Appl. No.: 12/644,529

(22) Filed: Dec. 22, 2009

(65) Prior Publication Data
US 2011/0153989 A1    Jun. 23, 2011

(51) Int. Cl.
G06F 15/00 (2006.01)
G06F 15/76 (2006.01)
G06F 9/30 (2006.01)

(52) U.S. Cl.
CPC ........ *G06F 9/30021* (2013.01); *G06F 9/30032* (2013.01); *G06F 9/30036* (2013.01); *G06F 9/3004* (2013.01); *G06F 9/30087* (2013.01)
USPC ............................................... 712/7; 712/22

(58) Field of Classification Search
None
See application file for complete search history.

(56) References Cited

U.S. PATENT DOCUMENTS

| 6,460,121 | B1 * | 10/2002 | Bonola ........................ 711/154 |
| 7,627,723 | B1 | 12/2009 | Buck et al. |
| 2002/0147872 | A1 | 10/2002 | Steele, Jr. et al. |
| 2003/0069913 | A1 | 4/2003 | Deng et al. |
| 2004/0078554 | A1 | 4/2004 | Glossner, III et al. |
| 2006/0149924 | A1 | 7/2006 | Dwyer et al. |
| 2007/0143551 | A1 * | 6/2007 | Marr et al. ..................... 711/154 |
| 2007/0260634 | A1 | 11/2007 | Makela et al. |

FOREIGN PATENT DOCUMENTS

| CN | 1633637 A | 6/2005 |
| CN | 1662904 A | 8/2005 |
| CN | 1790310 A | 6/2006 |
| JP | S6285372 A | 4/1987 |
| JP | 2007-157142 A | 6/2007 |
| TW | I297853 B | 6/2008 |
| WO | 2006/066262 A2 | 6/2006 |
| WO | 2011/087590 A2 | 7/2011 |
| WO | 2011/087590 A3 | 10/2011 |

OTHER PUBLICATIONS

Patent Cooperation Treaty, Notification of Transmittal of the International Search Report and the Written Opinion of the International Searching Authority mailed Aug. 30, 2011 in international application No. PCT/US2010/058238.

(Continued)

*Primary Examiner* — Corey S Faherty
(74) *Attorney, Agent, or Firm* — Vecchia Patent Agent, LLC

(57) ABSTRACT

A vector compare-and-exchange operation is performed by: decoding by a decoder in a processing device, a single instruction specifying a vector compare-and-exchange operation for a plurality of data elements between a first storage location, a second storage location, and a third storage location; issuing the single instruction for execution by an execution unit in the processing device; and responsive to the execution of the single instruction, comparing data elements from the first storage location to corresponding data elements in the second storage location; and responsive to determining a match exists, replacing the data elements from the first storage location with corresponding data elements from the third storage location.

22 Claims, 6 Drawing Sheets

(56) References Cited

OTHER PUBLICATIONS

Office Action received for Chinese Patent Application No. 201010619577.2, mailed on Aug. 15, 2014, 24 pages of Office Action including 16 pages of English Translation.
Notice of Allowance Received for Taiwan Patent Application No. 099138849, mailed on Oct. 30, 2013, 2 pages of Notice of Allowance only.
Office Action received for Taiwan Patent Application No. 099138849, mailed on Jun. 14, 2013, 14 pages of Office Action including 7 pages of English Translation.
Notice of Allowance received for Korean Patent Application No. 10-2012-7019177, mailed on Aug. 7, 2014, 4 pages of Notice of Allowance including 1 page of English Translation.
Office Action received for Korean Patent Application No. 10-2012-7019177, mailed on Dec. 13, 2013, 6 pages of English Translation only.
Office Action received for Chinese Patent Application No. 201010619577.2, mailed on Nov. 25, 2013, 21 pages of Office Action including 14 pages of English Translation.
Decision for Grant Received for Japanese Patent Application No. 2012-517936, mailed on Oct. 22, 2013, 1 page of Notice of Grant only.
Office Action Received for Japanese Patent Application No. 2012-517936, mailed on May 14, 2013, 5 pages of Office Action including 3 pages of English Translation.
International Preliminary Report on Patentability and Written Opinion received for PCT Patent Application No. PCT/US2010/058238, mailed on Jul. 5, 2012, 6 pages.
Harris, et al., "A practical Multi-Word Compare-and-Swap Operations", 2002, 16 pages.
State Intellectual Property Office, P.R. China, Office Action mailed Mar. 12, 2013 in Chinese application No. 201010619577.2.
Office Action received for German Patent Application No. 112010004963.7, mailed on Dec. 17, 2014, 31 pages of Office Action including 16 pages of English Translation.
Kumar, S. et al., "Atomic Vector Operations on Chip Multiprocessors", Retrieved from http://ieeeexplore.ieee.org/xpls/abs_all.jsp?arnumber=4556746 on Dec. 16, 2014, International Symposium on Computer Architecture, 2008. ISCA '08, 2008, pp. 441-452.
Lindholm, E. et al., "NVIDIA Tesla: A Unified Graphics and Computing Architecture", Retrieved from http://ieeexplore.ieee.org/xpls/abs_all.jsp?arnumber=4523358 on Dec. 16, 2014, Micro, IEEE, 28, 2008, 2, pp. 39-55.
Michael, M.M. et al., "Scalable Atomic Primitives for Distributed Shared Memory Multiprocessors", Retrieved from https://cs.rochester.edu/u/scott/papers/1994_SSMM_atomic-s.pdf on Dec. 16, 2014, Proc. First Symp. On High Performance Computer Architecture, 1995, pp. 1-8.
Ha, P.H. et al., "Reactive multiword synchronization for multiprocessors", Retrieved from http://ieeexplore.ieee.org/xpls/abs_all.jsp?arnumber=1238014 on Dec. 16, 2014, 12th International Conference on Parallel Architectures and Compilation Techniques, 2003, PACT 2003, Proceedings, 2003, pp. 184-193.
Attiya, H. et al., "Highly-Concurrent Multi-word Synchronization", Retrieved from http://dx.doi.org/10.1007/978-3-540-77444-0_9 on Dec. 16, 2014, Distributed Computing and Networking, Lecture Notes in Computer Science, Berlin Heidelberg: Springer, 2008, pp. 112-123.
Kozyrakis, C.E., "CS252 Graduate Computer Architecture, Lecture 15—Multimedia Instruction Sets—SIMD and Vector", Retrieved from http://www.cs.berkley.edu/~pattrsn/252S01/Lec15-vector.pdf on Dec. 16, 2014, University of California at Berkeley, 2001.
Wikipedia, "Compare-and-swap", Retrieved from http://en.wikipedia.org/w.index.php?title=Compare-and-swap&oldid=331431736 on Dec. 16, 2014, 4 pages.
Wikipedia, "Load-link/store-conditional", Retrieved from http://en.wikipedia.org/w/index.php?title=Load-link/store-conditional&oldid=313434400 on Dec. 16, 2014, 2 pages.

* cited by examiner

VECTOR COMPARE-AND-EXCHANGE OPERATION

BACKGROUND

This disclosure relates to microprocessors and other processing devices and, more particularly, to synchronization of SIMD vectors.

Multiple threads and/or processing units (hereafter referred to as agents), e.g., in systems incorporating multi-threaded processors, multiple processing devices, and/or multi-core processors, may often times need to share resources and data stored within the system. Care is taken to insure that an agent accesses the most recent and up-to-date data and also to insure that an agent does not access and modify data currently associated with another agent. Further complicating this sharing of data and resources, most modern-day processing devices include one or more dedicated cache memories. Within multi-processor and multi-core systems, the multiple on-chip caches will often—and, in practice, generally do—contain multiple copies of a data item. Accordingly, when an agent accesses a copy of a data item, it is insured that an updated or valid data value is read.

Thus, "cache coherency" is maintained in these systems. Cache coherency refers to the synchronization of data written from, or read into, cache memory, such that any data item stored in a cache that is accessed by a thread or processor is the most recent copy of that data item. Further, any data value written from cache back into main memory should be the most current data.

One method of maintaining cache coherency and insuring that, when a data item is needed by an agent, the most up-to-date value for that data item is accessed is to implement a semaphore (e.g., a flag or lock). A lock, for example, comprises a process that is performed in response to a request for a specific data item from memory by an agent (e.g., in a load operation) to insure synchronization between processors and/or threads. Generally, a lock is associated with a set of instructions, including the read/load instruction, an instruction to modify the data item, and a write/store instruction. The lock—also referred to herein as a "lock sequence" or "lock operation"—may, for example, include acquiring ownership of a memory location that stores data, performing an atomic operation on the data while preventing other processes from operating on that data, and releasing ownership of the memory location after the atomic operation is performed. An atomic operation is one that is performed sequentially and in an uninterrupted manner and, further, that is guaranteed to be completed or not completed at all (i.e., the operation is indivisible).

Other features and advantages will be apparent from the description and drawings, and from the claims.

DETAILED DESCRIPTION

In the following description, numerous specific details are set forth, such as specific instructions, instruction formats, devices such as registers and memory, etc., in order to provide a thorough understanding of the examples provided herein. However, it will be appreciated by one skilled in the art that the present invention may be practiced without these specific details.

One way to determine whether a semaphore is locked (and/or to make it so) is through the use of a read-modify-write sequence (or operation). However, one concern with a read-modify-write implementation is the acquisition and the release of the semaphore mechanism itself. That is, when a process attempts to gain control of the shared memory space, it first reads the lock value, check and modify (if permitted) the value and write the modifying value back to the lock. It is generally desirable to execute the read-modify-write operation as an atomic operation (i.e., completed without interruption once execution has begun) to prevent other processes from modifying the lock value. By using an atomic operation, a process can acquire (read) the semaphore, modify the value (if permitted) and release the semaphore by initiating a write to complete the operation before another process attempts to acquire the lock.

Figure 1:
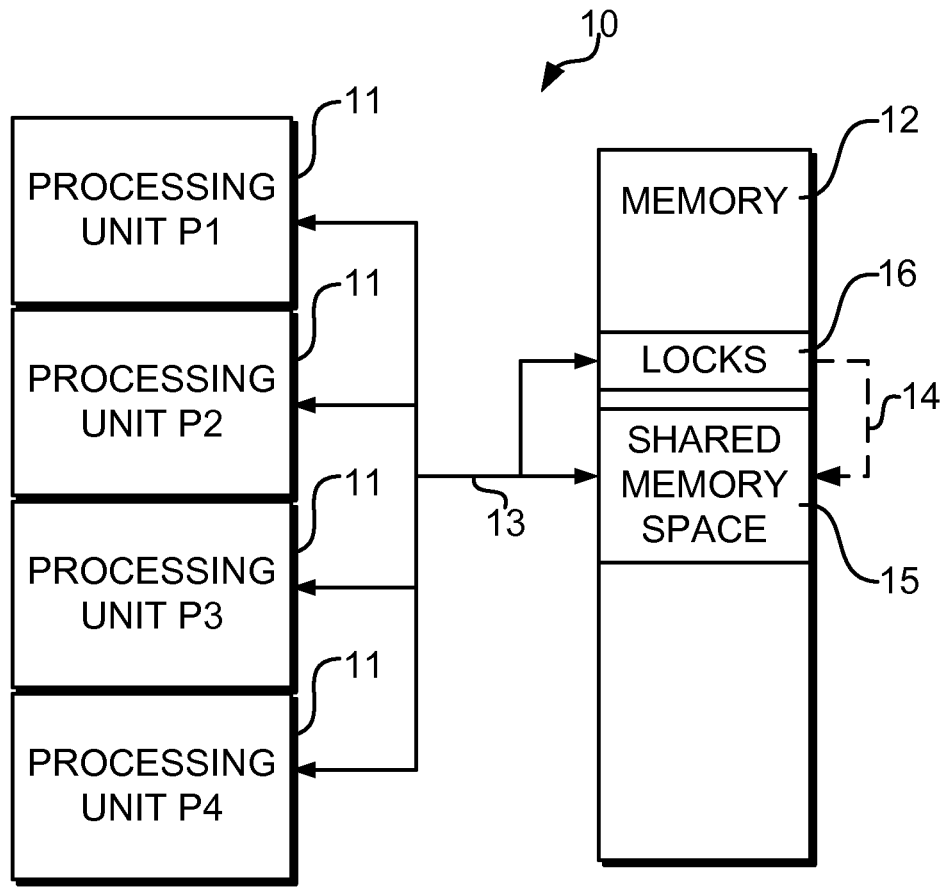
FIG. 1 shows a block diagram of a computing system.

Referring now to FIG. 1, computer system 10 is shown having a plurality of processing units 11 (e.g., processors, cores, execution units, etc.) coupled to a memory 12 (e.g., registers, cache, RAM, etc.) by a bus 13. One or more of the processing units 11 is associated with one or more threads. Accordingly, computer system 10 includes any suitable number of processing units 11, each having any suitable number of threads. Processing units 11 may each form part of a separate integrated circuit device or, alternatively, all of the processing units 11 (or a portion thereof) may be formed on a single die. In this particular computer system, four processing units 11 (designated as P1, P2, P3 and P4) are shown as part of system 10. All four processing units 11 are coupled to memory 12 and specifically to a shared memory space 15 within memory 12.

It is appreciated that memory 12 can be configured in a variety of ways. Although illustrated as a single memory, memory 12 may comprise multiple internal and/or external memories. In the particular example, all four processing units 11 access memory 12, and a portion of memory 12, designated as shared space 15, is accessed by more than one processing unit 11. It is possible that there may be other shared areas within memory 12, in which two or more processing units 11 have the ability to access such shared areas. The non-shared areas of memory 12 are generally relegated to access by one processing unit 11 only.

Computer system 10 illustrated in FIG. 1 is intended to be an exemplar computer system and may include many additional components, which have been omitted for clarity. By way of example, the computer system 10 may include a DMA (direct memory access) controller, a network interface (e.g., a network card), a chip set associated with one or more of the processing units 11, as well as additional signal lines and buses. Also, it should be understood that computer system 10 may not include all of the components shown in FIG. 1.

In FIG. 1, the semaphores employed are locks (or lock variables) 16, which are assigned to control accesses to one or more respective shared spaces 15 (as shown by dotted-line 14). Lock 16 is a particular location in memory that is assigned to contain a value associated with obtaining access to the shared space 15. Thus, in order for one of the processing units 11 to access shared space 15, it first accesses the corresponding lock 16 and test the state (value) of the data stored in lock location 16. In the simplest format, two values can be assigned to lock 16. A first value indicating that the shared space is available for access and a second value indicating that the shared space is currently being utilized and, therefore, is not available for access. Again, in the simplest embodiment, bit states 1 and 0 can be used for the locked and unlocked states for lock 16.

It is to be appreciated that the actual lock values and lock states for lock 16 is a design choice and many variations can be devised. Also, the location of lock 16 need not be within memory 12 itself. Furthermore, in reference to FIG. 1, it is appreciated that memory 12 can be one of a variety of memory devices. It is also possible that one or more of processing units 11 can be replaced by a memory accessing device(s) (devices such as direct memory access controllers), which also access(es) the memory. In these instances, these devices would function similar to processing units 11 described herein for gaining access to shared space 15. Finally, although only a single bus 13 is shown, there may be a plurality of buses at the same or different hierarchical level(s) as bus 13 for coupling the various devices.

The accessing of memory 12 by processing units 11 for data transfer typically involves the use of load and store operations. The load operation transfers memory content from a location in memory accessed and the store operation transfers data to a memory location accessed. Thus, load/store operations are used to access the memory 12 and lock 16 for data transfer between processing units 11 and memory 12. The load and store accesses are also referred to as read and write accesses, respectively.

Figure 2:
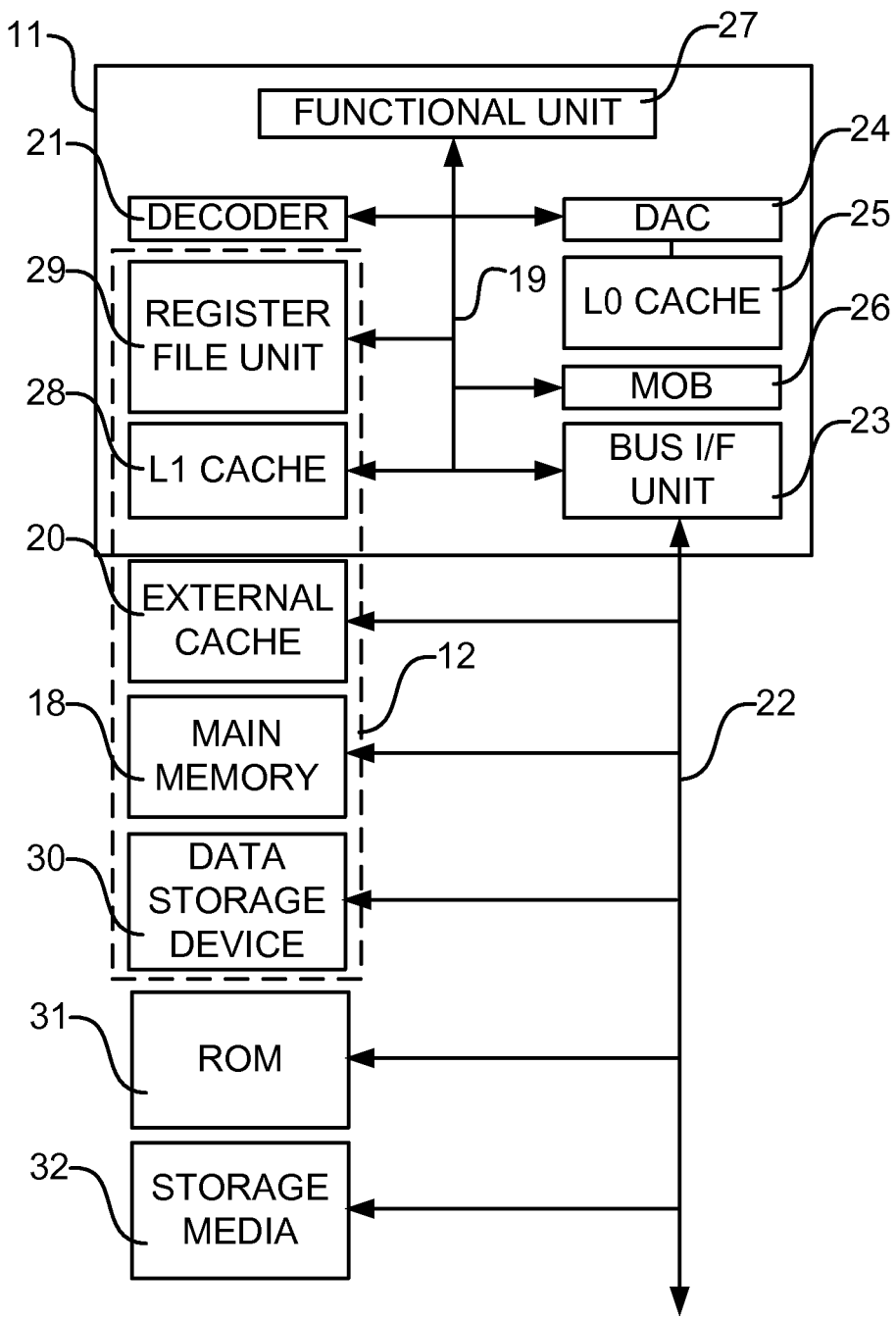
FIG. 2 is a schematic diagram of a processing device, as shown in FIG. 1.

Referring to FIGS. 1 and 2, computer system 10 includes a read-only memory (ROM) 31 and a main memory 18 coupled—via system bus 22—with processing units 11, main memory 18 comprising, for example, any suitable type of random access memory (RAM). Processing units 11 also have a data storage device 30 coupled therewith by system bus 22. Data storage device 30 comprises any suitable non-volatile memory, such as, for example, a hard disk drive. Computer system 10 further includes a removable storage media 32, such as a floppy disk drive, a CD ROM drive, and/or a USB Drive.

In FIG. 2, processing unit 11 includes a number of components that are interconnected by one or more buses, and these buses are illustrated symbolically in FIG. 2 by a local bus 19. Local bus 19—and, hence, the components of processing unit 11—are coupled with a bus interface unit 23. Bus interface unit 23 couples processing unit 11 with system bus 22, thereby enabling communication between processing unit 11 and main memory 18, as well as between processing unit 11 and an external cache 20.

Processing unit 11 includes an instruction decoder 21 coupled with local bus 19. Instruction decoder 21 receives an instruction (or instructions) associated with a program or piece of code executing on processing unit 11 and breaks the instruction down into one or more machine-level instructions/operations (uops). It should be understood that processing unit 11 may receive one or more instructions associated with a program, whereas another processing unit 11 of computer system 10 may receive one or more instructions associated with the same program. Accordingly, a program may be executing on multiple processing units 11.

Processing unit 11 further includes multiple execution units, including, for example, data access control unit (DAC) 24, memory-ordering buffer (MOB) 26, a register file unit 29, and functional unit 27.

Register file unit 29 includes a plurality of registers, each having 16, 32, 64, 128, 256, or 512 bits of storage. Further, register file 29 may include one or more register files, each having one or more registers. Functional unit 27 comprises one or more functional units, such as, for example, an arithmetic, logic, and/or floating-point unit. MOB 26 ensures the proper ordering of load and store instructions and, further, provides for the proper sequencing of these transactions within the memory hierarchy (i.e., the various levels of memory within computer system 10, including L0 cache 25, L1 cache 28, external cache 20, main memory 18, and data storage device 30). Each of the L0 cache 25 and L1 cache 28 can store data recently accessed, or expected to be accessed, by functional unit 27. If an item of data requested by functional unit 27 is resident in one of cache memories 25, 28, a cache "hit" has occurred; however, if the requested data is not present in cache, then a cache "miss" has occurred. One or more of the cache memories (e.g., L0 cache 25) may be coupled with DAC 24. DAC 24 controls all transactions that resulted in a cache miss, as well as other transactions that require special handling. A lock, as described above, is one type of transaction that requires special handling by the DAC 24 and by other components of processing unit 11. If a uop corresponds to, for example, an arithmetic operation, that uop is dispatched to functional unit 27, which then performs the arithmetic operation. If a uop corresponds to a memory-referencing instruction—e.g., a load or a store—that uop is dispatched to MOB 26.

It should be understood that the processing unit 11 illustrated in FIG. 2 is intended to represent an exemplar processing device and, further, that such a processing unit may include many additional components that are not shown in these figures. These components having been omitted for ease of understanding. For example, the processing unit 11 may include an address generation unit, a reservation station, reorder buffer, scheduler, a segmentation and address translation unit, a translation lookaside buffer, a page miss handler, and/or internal clock circuitry. Also, although illustrated as discrete elements, it should be understood that many of the components shown in FIG. 2 may be combined and/or share circuitry. Most importantly, the embodiments described herein are not limited to any particular architecture or arrangement—as well as not being limited to any particular terminology used to describe such an architecture or arrangement—and the disclosed embodiments may be practiced on any type of processing device, irrespective of its architecture or the terminology ascribed to it.

Any one or more of the uops scheduled for execution may comprise a locked uop. The lock, as noted above, corresponds to a sequence of operations (e.g., load, modify, and store) that are performed in a manner that insures synchronization between processors and/or threads.

Figure 3:
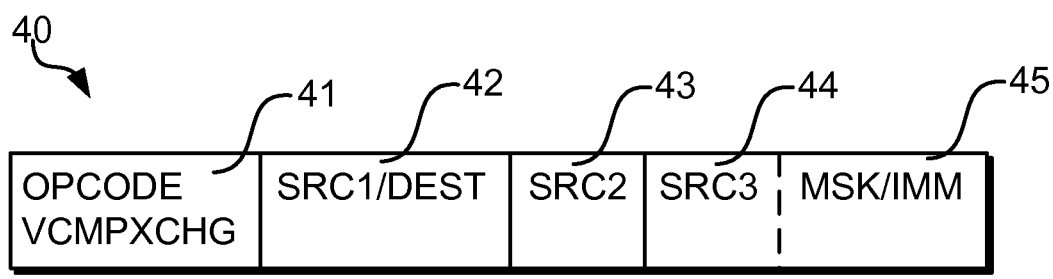
FIG. 3 shows an encoding scheme of a single-instruction-multiple-data (SIMD) vector compare-and-exchange instruction.

FIG. 3 shows an instruction for performing a read-modify-write operation. Instruction 40 is a single atomic instruction including five operands 41-45. Opcode operand 41 identifies that this is a VCMPXCHG instruction. Operands 42-44 correspond to the source and destination operands associated with SRC1/DEST, SRC2, SRC3, and, in some implementations, a mask storage location (MSK) and/or an offset (or "immediate") operand 45. This offset or immediate is used to provide for an offset from a base address (such as SRC1) when addressing memory 12. The instructions noted below may have such offsets, but are not illustrated. Implementations specifying a mask storage location 45 reference a register or memory location that stores mask elements corresponding to respective data elements stored at the storage location referenced by the SRC1/DEST operand.

In response to instruction 40, processing unit 11 reads a first source data, compares it to another source data and if the comparison meets a predesignated condition (such as a true or match condition), some modified value is written to a location, which may be the original location of the first source data. If the predesignated condition is not met, the original data in the location is not changed. The instruction utilizes three source operands (such as SRC1, SRC2 and SRC3, as used hereinafter) and one destination operand (such as DEST, as used hereinafter) to supply the location of the various information used in executing the instruction. Operation-specific registers may be used for providing one or more of the source data and/or for storing the destination data when the instruction is executed, eliminating the need to specify the operands explicitly in the actual instruction format. Further, in this example, the SRC1 operand and the DEST operand refer to the same storage location (SRC1/DEST).

Prior to the execution of the instruction 40, SRC1, SRC2 and SRC3 are loaded into registers in register file unit 29. For example, to safely update a value stored in a location specified by the SRC1/DEST operand, the value is initially read into a location specified by the SRC2 operand, and a replacement value is read into a location specified by the SRC3 operand. Then, an atomic compare-exchange operation is executed to compare the present value associated with the SRC1/DEST operand to the value associated with the SRC2 operand (i.e., the present value may be different from the initially copied value due to modification by another agent). If the value has not changed, it is replaced with the value associated with the SRC3 operand, and the zero flag is set to indicate a successful update. However, if another agent has modified the value between the initial copy and the compare-exchange operation, the current value is not replaced and the zero flag is cleared to indicate a failed update.

Figure 4:
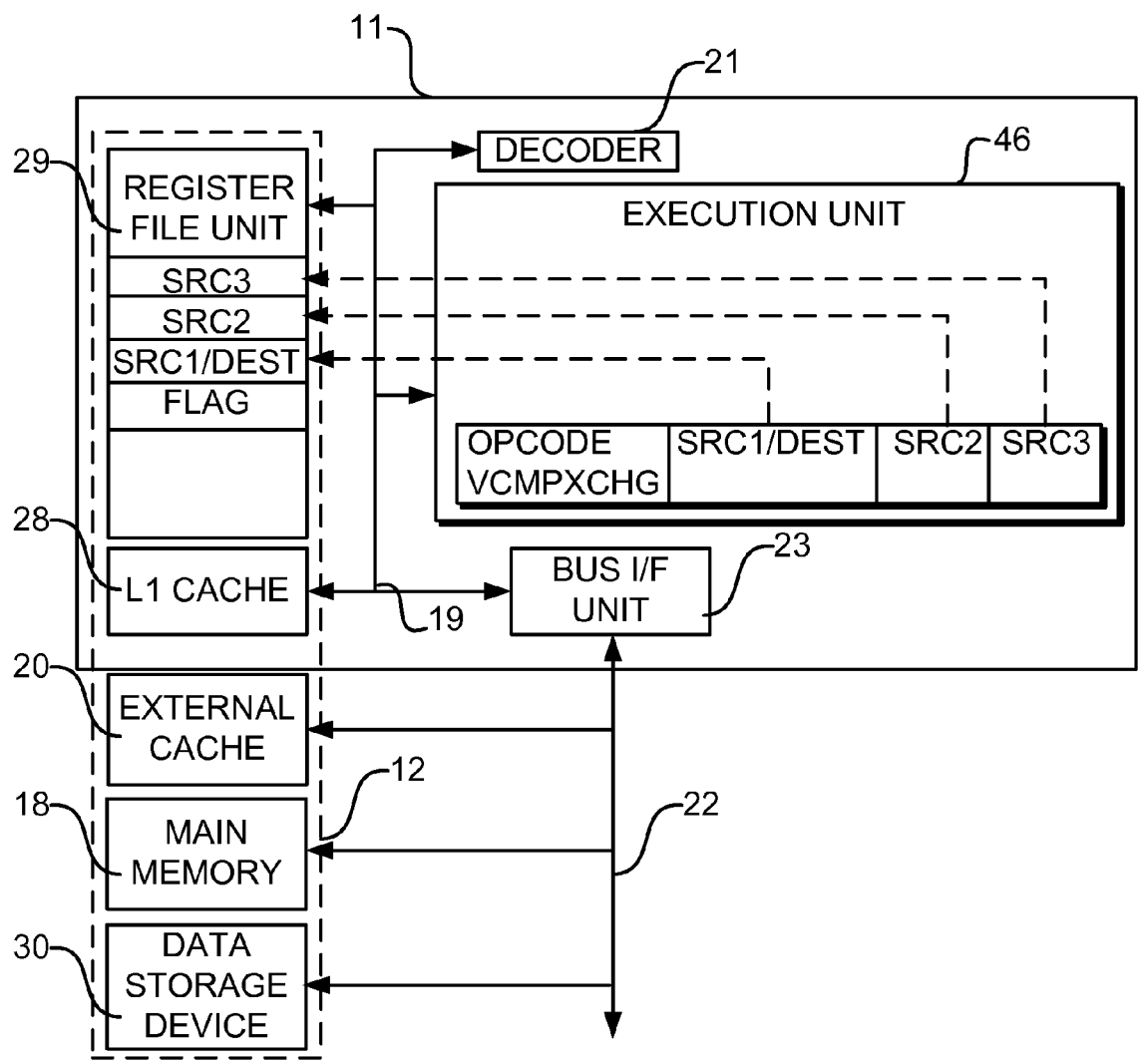
FIG. 4 is a block diagram of a first exemplar computer system for implementing the instruction format shown in FIG. 3.

The block diagram of FIG. 4 illustrates the information flow when instruction 40 is executed. The processing unit 11 includes an execution unit 46 (e.g., DAC 24 of FIG. 2), register file 29, BIU 23, and decoder 21, which are all coupled together by local bus 19. Register file 29 includes a plurality of registers which are accessed by execution unit 46 for executing the various operations. As noted in FIG. 4, the VCMPXCHG instruction 40 is shown resident within execution unit 46 and dotted lines are shown from the operands of the instruction to the corresponding registers associated with SRC1, SRC2, SRC3 and DEST. The registers reside within register file 29. Decoder 21 is used to decode the various instructions (including VCMPXCHG instruction 40), in order for execution unit 46 to perform the operations.

Memory 12, previously described in FIGS. 1 and 2, is shown coupled to BIU 23 by bus 19 and/or bus 22. Accordingly, data transfers between processing unit 11 and memory 12 may occur through BIU 54a or local bus 19. It is to be appreciated that the program routine utilizing the VCMPXCHG instruction 40 may reside within some memory, which could also be or include memory 12.

The following pseudo-code illustrates examples of how the VCMPXCHG instruction 40 operates. Other pseudo-code, languages, operations, orders of operations, and/or numbers may be used.

```
VCMPXCHG (VEX.128 encoded version)
IF (DEST[127:0] == SRC2[127:0])
THEN
    DEST[127:0] ← SRC3[127:0]
    ZF← 1
ELSE
    SRC2[127:0] ← DEST[127:0]
    ZF← 0
FI
SRC2[511:128] ← 0
VCMPXCHG (VEX.256 encoded version)
IF (DEST[255:0] == SRC2[255:0])
THEN
    DEST[255:0] ← SRC3[255:0]
    ZF← 1
ELSE
    SRC2[255:0] ← DEST[255:0]
    ZF← 0
FI
SRC2[511: 256] ← 0
```

In the specific VEX.128 and VEX.256 examples noted above, lock values are stored in bits [127:0] and bits [255:0], respectively, of a 512-bit storage location referenced by SRC1/DEST (e.g., a 64 byte cache line or register). In one embodiment, there is a one-to-one correspondence between the lock values referenced by SRC1/DEST and the shared storage locations 15 to which they correspond. For example, SRC1/DEST may reference sixteen 8-bit lock values (128 bits), each corresponding to a respective one of sixteen storage locations in a cache line or SIMD register. Alternatively, SRC1/DEST may reference thirty-two 8-bit lock values (256 bits), each corresponding to a respective one of thirty-two storage locations in a cache line or SIMD register.

Referring again to the examples above, the result of the comparison between SRC1/DEST and SRC2 indicates whether the lock values have been modified. A true condition indicates the locks have not been modified and that the locks are in the unlocked state. When this condition is met, the values referenced by SRC3 are written to SRC1/DEST, modifying the lock values to a locked state, in order to prevent other agents from having access to the shared space(s). Thereafter, the zero flag (ZF) is set to indicate a successful operation.

A false condition indicates one or more of the locks have been modified (locked) and that another agent has taken ownership of the shared space. When the condition is false, the values referenced by SRC1/DEST (the current lock values) are stored to SRC2, and the zero flag is cleared to indicate an unsuccessful operation. The upper bytes of SRC2 are then cleared prior to returning from the operation.

Typically, if access is first refused, the interrogating agent will continue to retry for the access until access is acquired. In some implementations, an outer loop will include a non-atomic load and test prior to re-executing VCMPXCHG instruction 40. Once the processor completes its access(es) to the shared memory space 15, it will typically release its control over the shared memory space 15 with a write cycle to lock 16 to unlock it, so that other agents can now gain entry into shared memory space 15. However, it is appreciated that how the processor releases the shared memory space is a design choice, which could be dictated by the system architecture.

In some implementations, VCMPXCHG instruction 40 includes a mask vector having multiple mask elements, each corresponding to one of a plurality of data elements referenced by SRC1/DEST. The mask vector storage location may be a register in a register file unit 29, such as, for example, a shadow register, a control register, a flag register, a general purpose register, a SIMD register, or other appropriate register. In one embodiment, there is a one-to-one correspondence between data elements referenced by SRC1/DEST and corresponding mask elements stored in a mask register. Mask elements or values may include flags, markers, tabs, indicators, and or other numbers, bits and/or codes for indicating whether a corresponding data element (e.g., in a corresponding or pointed register location) is to be compared and/or modified. For example, a mask element having a value of "1" may indicate that a corresponding data element is to be modified; otherwise a "0" may be used. Other numbers or flags may be used.

Examples of masked VCMPXCHGD and VCMPXCHGQ instructions are illustrated in pseudo-code below for a 16 wide, 512 byte vector and an 8 wide, 512 byte vector, respectively. In the masked compare implementations, only the active elements are compared and updated.

```
VCMPXCHGD (EVEX.512 encoded version)
ALL_CMPS_SUCCEED←1
FOR j←0 TO 15
    i←j*32
    IF k1[j] OR *no writemask*
    THEN
        IF(DEST[i+31:i]!=SRC2[i+31:i])
            THEN ALL_CMPS_SUCCEED←0
        FI
ENDFOR
IF(ALL_CMPS_SUCCEED == 1)
THEN
    ZF←1
    FOR j←0 TO 15
        i←j*32
        IF k1[j] OR *no writemask*
            THEN DEST[i+31:i] ←SRC3[i+31:i]
        FI
    ENDFOR
ELSE
    ZF←0
    FOR j←0 TO 15
        i←j*32
        IF k1[j] OR *no writemask*
            THEN SRC2[i+31:i] ←DEST[i+31:i]
        FI
    ENDFOR
FI
VCMPXCHGQ (EVEX.512 encoded version)
ALL_CMPS_SUCCEED←1
FOR j←0 TO 7
    i←j*64
    IF k1[j] OR *no writemask*
    THEN
        IF(DEST[i+63:i]!=SRC2[i+63:i])
            THEN ALL_CMPS_SUCCEED←0
        FI
ENDFOR
IF(ALL_CMPS_SUCCEED == 1)
THEN
    ZF←1
    FOR j←0 TO 7
        i←j*64
        IF k1[j] OR *no writemask*
            THEN DEST[i+63:i] ←SRC3[i+63:i]
        FI
    ENDFOR
ELSE
    ZF←0
    FOR j←0 TO 7
        i←j*64
        IF k1[j] OR *no writemask*
            THEN SRC2[i+63:i] ←DEST[i+63:i]
        FI
    ENDFOR
FI
```

In the specific VCMPXCHGD and VCMPXCHGQ examples noted above, a variable, ALL_CMPS_SUCCEED, is first preset to 1 (i.e., a true condition). Once set, for each active mask element (e.g., a mask element having a particular value stored therein, including, for example, a binary 1 or hexadecimal values 0x01, 0xFF, or 0x80), the corresponding storage location referenced by SRC1/DEST is compared to the value referenced by corresponding bits in SRC2. If no mask is used, each of the storage locations referenced by SRC1/DEST is compared to the value referenced by corresponding bits in SRC2.

Once again, the result of the comparison between corresponding values of SRC1/DEST and SRC2 indicates whether that particular lock value has been modified. However, in these examples, a true condition (i.e. a non-matching condition) indicates the lock has been modified and that another agent has taken ownership of the shared storage location. When this condition is met for any one of the referenced storage locations, ALL_CMPS_SUCCEED is cleared, indicating that all comparisons did not succeed. Thereafter, the zero flag is cleared and for each active mask element, the value stored in the corresponding storage location referenced by SRC1/DEST is loaded into corresponding bits in SRC2.

When the result of the comparison is false (i.e., for each of the active mask elements, a corresponding value referenced by SRC1/DEST matched a corresponding value in SRC2), ALL_CMPS_SUCCEED remains set without change. Thereafter, the zero flag (ZF) is set and for each active mask element, the value stored in the corresponding storage location in SRC3 is loaded into corresponding bits in SRC1/DEST, modifying the lock values to a locked state, in order to prevent other agents from having access to the shared spaces.

Figure 5:
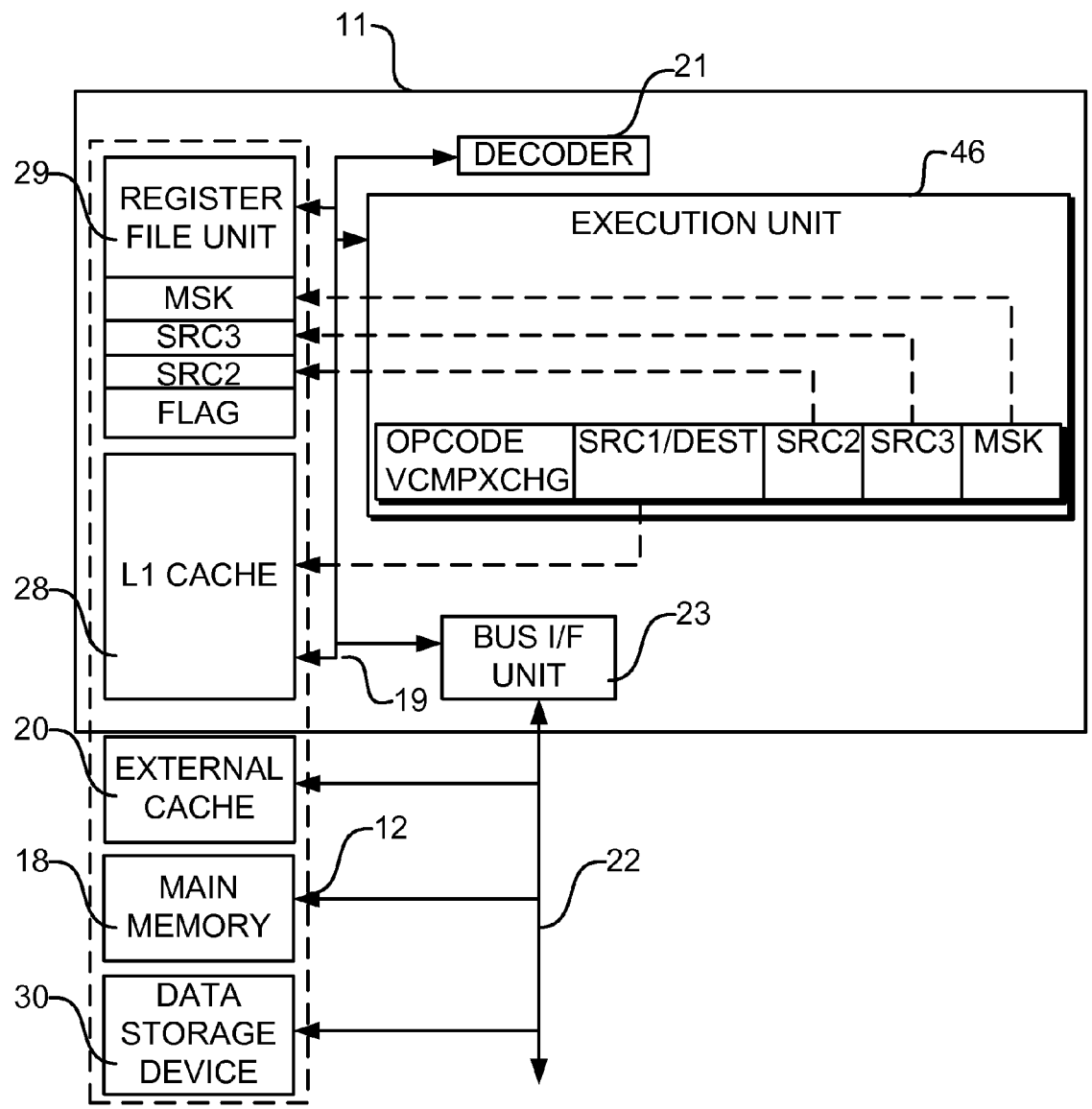
FIG. 5 is block diagram of a second exemplar computer system for implementing the instruction format shown in FIG. 3.

The block diagram of FIG. 5 illustrates another example of the information flow when instruction 40 is executed. As noted in FIG. 5, the VCMPXCHG instruction 40 is shown resident within execution unit 46 and dotted lines are shown from the operands of the instruction to the corresponding registers associated with SRC2, SRC3, and MSK. In this example, the mask storage location (MSK) is a mask register and the storage location associated with SRC1/DEST is an L1 cache. The registers reside within register file unit 29.

Prior to the execution of instruction 40, SRC1 is prefetched into the L1 cache and SRC2, SRC3, and MSK data are loaded into the registers in register file unit 29. The mask register stores a plurality of mask elements corresponding to respective data elements in the storage location associated with the SRC1/DEST operand. In addition, a comparison value is initially read into a location specified by the SRC2 operand, and a replacement value is read into a location specified by the SRC3 operand. Then, instruction 40 is executed to cause execution unit 46 to compare corresponding data elements associated with the SRC1/DEST and SRC2 operands, and if a match exists, to replace data elements from SRC1/DEST with corresponding data elements from SRC3. If a match does not exist, execution of the instruction 40 causes execution unit 46 to replace SRC2 data elements with corresponding SRC1/DEST data elements.

In some implementations, the comparison between pairs of SRC1/DEST and SRC2 data elements is only performed if a corresponding mask element is active. In certain implementations, execution unit 46 is further configured to set a flag if a match exists between each pair of corresponding data elements for which a corresponding mask element is active and to clear the flag if a match does not exist between any of the of the pairs for which a corresponding mask element is active. Further, in some implementations, replacement of the SRC1/DEST data elements by corresponding SRC3 data elements is only performed if a mask element corresponding to the respective SRC1/DEST data element is active. Still further, in some implementations, replacement of the SRC2 data element by a corresponding SRC1/DEST data element is only performed if a mask element corresponding to the SRC1/DEST data element is active.

In some embodiments, the lock value indicating a locked condition is the same as the mask value indicating an active mask element (e.g., a binary 1). In such cases, SRC3 may be used as both a mask vector and a lock value replacement vector.

In some implementations, the compare-exchange operation completes execution without updating the value associated with the SRC2 operand. Thereafter, a flag (e.g., the zero flag) is tested and if it indicates the update operation failed with respect to the value associated with the SRC1/DEST operand, the steps just prior to the compare-exchange operation are repeated to update values associated with SRC2 and SRC3 prior to repeating the compare-exchange operation.

One or more embodiments include an article of manufacture that includes a tangible machine-accessible and/or machine-readable medium having stored thereon a SIMD instruction specifying a vector compare-and-exchange operation for a plurality of data elements, each data element having a corresponding test element, replacement element, and mask element, that if executed by a machine (e.g., an execution unit) causes the machine to compare data elements to corresponding test elements if respective mask elements are active; and responsive to determining all comparisons indicate a match, set a flag and replace compared data elements with corresponding replacement elements; and responsive to determining all comparisons do not indication a match, clear a flag and replace compared test elements with corresponding data elements. The tangible medium may include one or more solid materials. The medium may include, a mechanism that provides, for example stores, information in a form that is accessible by the machine. For example, the medium may optionally include recordable mediums, such as, for example, floppy diskette, optical storage medium, optical disk, CD-ROM, magnetic disk, magneto-optical disk, read only memory (ROM), programmable ROM (PROM), erasable-and-programmable ROM (EPROM), electrically-erasable-and-programmable ROM (EEPROM), random access memory (RAM), static-RAM (SRAM), dynamic-RAM (DRAM), Flash memory, and combinations thereof.

Suitable machines include, but are not limited to, execution units, general-purpose processors, special-purpose processors (e.g., graphics processors and cryptographic processors), cryptographic accelerators, network communications processors, computer systems, network devices, modems, personal digital assistants (PDAs), cellular phones, and a wide variety of other electronic devices with one or more execution units, to name just a few examples. Still other embodiments pertain to a computer system, embedded system, or other electronic device having an execution unit and/or performing a method as disclosed herein.

Figure 6:
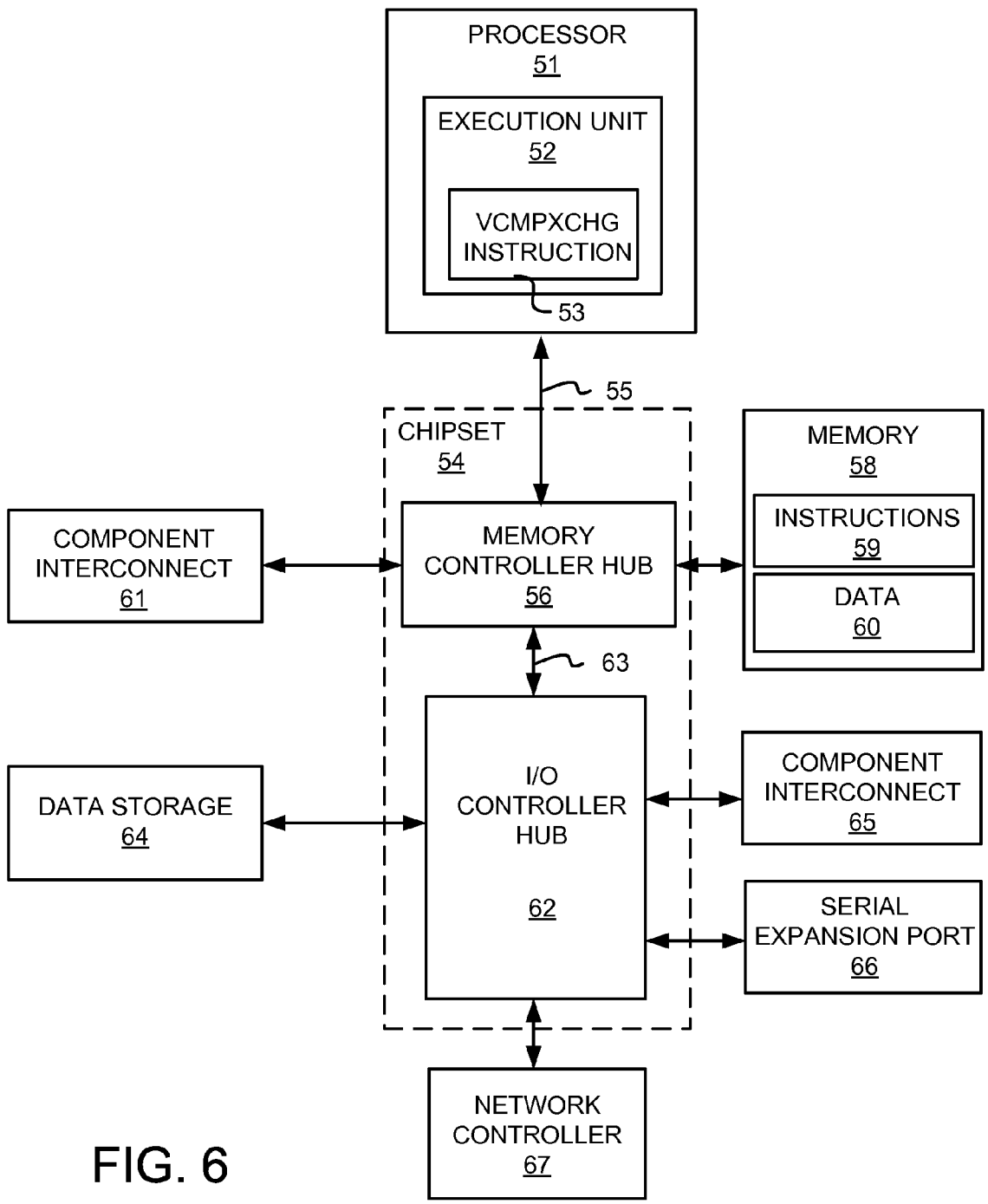
FIG. 6 is a block diagram of a third exemplar computer system for implementing the instruction format shown in FIG. 3.

FIG. 6 illustrates an example of a suitable computer system 50 including a processor 51. The processor includes at least one execution unit 52 that is capable of executing at least one vector compare-and-exchange instruction 53.

The processor is coupled to a chipset 54 via a bus (e.g., a front side bus) or other interconnect 55. The interconnect may be used to transmit data signals between the processor and other components in the system via the chipset.

The chipset includes a system logic chip known as a memory controller hub (MCH) 56. The MCH is coupled to the front side bus or other interconnect 55.

A memory 58 is coupled to the MCH. In various embodiments, the memory may include a random access memory (RAM). DRAM is an example of a type of RAM used in some but not all computer systems. As shown, the memory may be used to store instructions 59, such as one or more multiply instructions, and data 60.

A component interconnect 61 is also coupled with the MCH. In one or more embodiments, the component interconnect may include one or more peripheral component interconnect express (PCIe) interfaces. The component interconnect may allow other components to be coupled to the rest of the system through the chipset. One example of such components is a graphics chip or other graphics device, although this is optional and not required.

The chipset also includes an input/output (I/O) controller hub (ICH) 62. The ICH is coupled to the MCH through hub interface bus or other interconnect 63. In one or more embodiments, the bus or other interconnect 63 may include a Direct Media Interface (DMI).

A data storage 64 is coupled to the ICH. In various embodiments, the data storage may include a hard disk drive, a floppy disk drive, a CD-ROM device, a flash memory device, or the like, or a combination thereof.

A second component interconnect 65 is also coupled with the ICH. In one or more embodiments, the second component interconnect may include one or more peripheral component interconnect express (PCIe) interfaces. The second component interconnect may allow various types of components to be coupled to the rest of the system through the chipset.

A serial expansion port 66 is also coupled with the ICH. In one or more embodiments, the serial expansion port may include one or more universal serial bus (USB) ports. The serial expansion port may allow various other types of input/output devices to be coupled to the rest of the system through the chipset.

A few illustrative examples of other components that may optionally be coupled with the ICH include, but are not limited to, an audio controller, a wireless transceiver, and a user input device (e.g., a keyboard, mouse).

A network controller 67 is also coupled to the ICH. The network controller may allow the system to be coupled with a network.

In one or more embodiments, the computer system may execute a version of the WINDOWS™ operating system, available from Microsoft Corporation of Redmond, Wash. Alternatively, other operating systems, such as, for example, UNIX, Linux, or embedded systems, may be used.

This is just one particular example of a suitable computer system. For example, in one or more alternate embodiments, the processor may have multiple cores. As another example, in one or more alternate embodiments, the MCH 56 may be physically integrated on-die with the processor 51 and the processor may be directly coupled with a memory 58 through the integrated MCH. As a further example, in one or more alternate embodiments, other components may be integrated on-die with the processor, such as to provide a system-on-chip (SoC) design. As yet another example, in one or more alternate embodiments, the computer system may have multiple processors.

Figure 7:
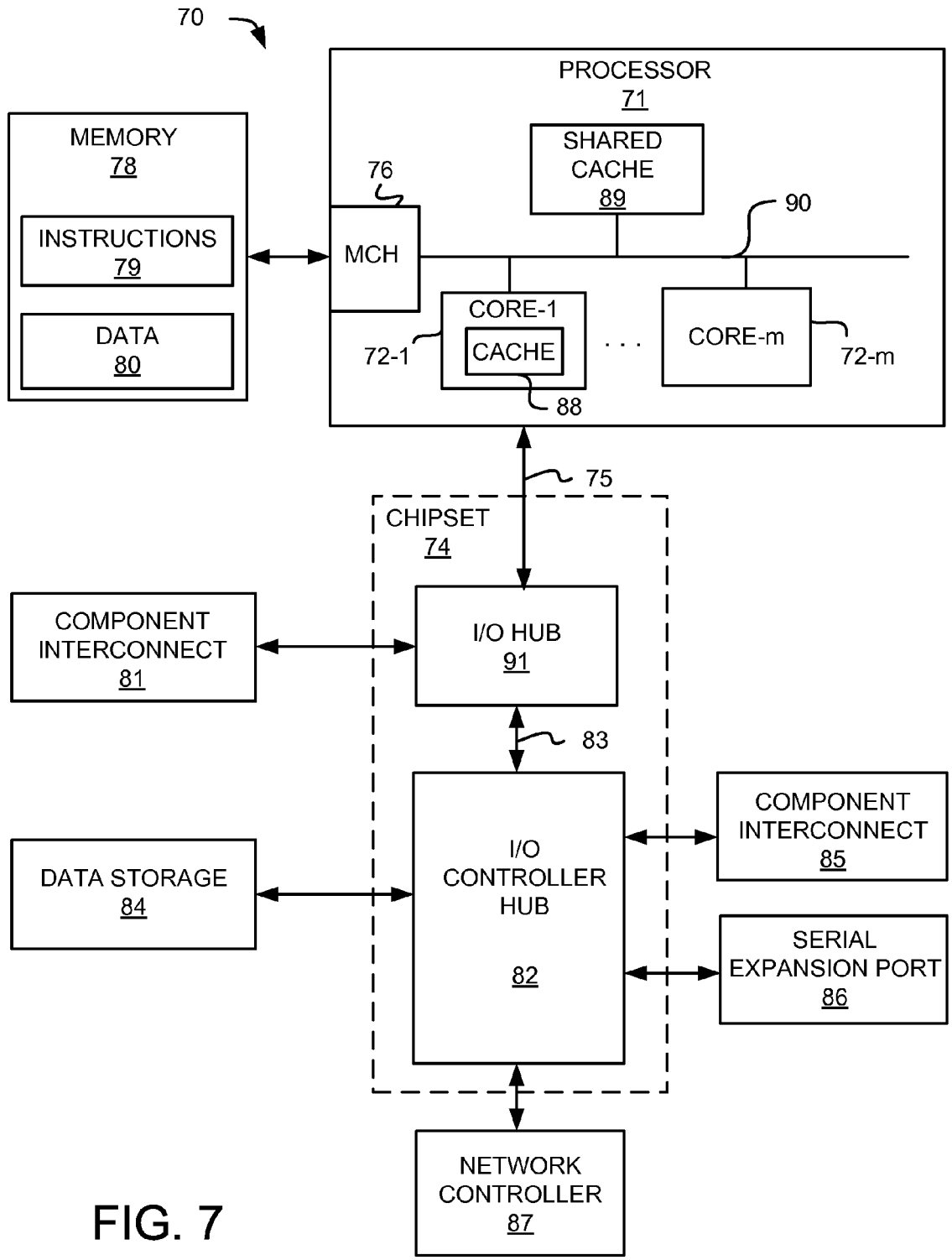
FIG. 7 is a block diagram of a fourth exemplar computer system for implementing the instruction format shown in FIG. 3.

FIG. 7 is another example of a suitable computer system 70. The second example embodiment has certain similarities to computer system 50 described above. For clarity, the discussion will tend to emphasize the differences without repeating all of the similarities.

Similar to computer system 50, computer system 70 includes a processor 71, and a chipset 74 having an I/O controller hub (ICH) 72. Computer system 70 also includes a first component interconnect 81 coupled with chipset 74, a second component interconnect 85 coupled with the ICH, a serial expansion port 86 coupled with the ICH, a network controller 87 coupled with the ICH, and a data storage 84 coupled with the ICH.

Processor 71 is a multi-core processor and includes processor cores 72-1 through 72-M, where M may be an integer number equal to or larger than two (e.g. two, four, seven, or more). Each core may include at least one execution unit that is capable of executing at least one embodiment of an instruction as disclosed herein. As shown, the core-1 includes a cache 88 (e.g., an L1 cache). Each of the other cores may similarly include a dedicated cache. The processor cores may be implemented on a single integrated circuit (IC) chip.

The processor also includes at least one shared cache 89. The shared cache may store data (e.g., instructions) that are utilized by one or more components of the processor, such as the cores. For example, the shared cache may locally cache data stored in a memory 78 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

The processor cores and the shared cache are each coupled with a bus or other interconnect 90. The bus or other interconnect may couple the cores and the shared cache and allow communication.

The processor also includes a memory controller hub (MCH) 76. As shown in this example embodiment, the MCH is integrated with the processor 71. For example, the MCH may be on-die with the processor cores. The processor is coupled with the memory 78 through the MCH. In one or more embodiments, the memory may include DRAM, although this is not required.

The chipset includes an input/output (I/O) hub 91. The I/O hub is coupled with the processor through a bus (e.g., a QuickPath Interconnect (QPI)) or other interconnect 75. The first component interconnect 81 is coupled with the I/O hub 91.

This is just one particular example of a suitable system. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or an execution unit as disclosed herein are generally suitable.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate embodiments of the invention. The scope of the invention is not to be determined by the specific examples provided above but only by the claims below. In other instances, well-known circuits, structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar characteristics.

Certain operations may be performed by hardware components, or may be embodied in machine-executable instructions, that may be used to cause, or at least result in, a circuit or hardware programmed with the instructions performing the operations. The circuit may include a general-purpose or special-purpose processor, or logic circuit, to name just a few examples. The operations may also optionally be performed by a combination of hardware and software. An execution unit and/or a processor may include specific or particular circuitry or other logic responsive to a machine instruction or one or more control signals derived from the machine instruction to store an instruction specified result operand.

It should also be appreciated that reference throughout this specification to "one embodiment", "an embodiment", or "one or more embodiments", for example, means that a particular feature may be included in the practice of embodiments of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

A number of embodiments of the invention have been described. Nevertheless, it will be understood that various modifications may be made without departing from the spirit and scope of the invention. For example, the computer systems need not be limited to computer systems having multiple processors or memory accessing devices. The present invention could be readily utilized in a single processor system, where a read-modify-write instruction is implemented.

It is further appreciated that the access controls to shared areas of the memory can be achieved by means other than the test-and-set sequence described in the example above. For example, a simple counter can be used in which each access is incremented by a specified count.

It is also appreciated that the VCMPXCHG instruction of the preferred embodiment performs the read-modify-write operation, but that the modifying and writing phases are achieved essentially as a single step. Instead of calculating modifying values after reading the original data and then subsequently writing the modifying values, the modifying values of the VCMPXCHG instruction are preset for use by the instruction. Although their use is dependent on the decision obtained when the comparison is made, this preset modifying values (SRC3) may be written immediately to the destination to modify the destination value.

Thus, a technique for implementing a vector compare-and-exchange operation which utilizes a mask is described. It is appreciated that the VCMPXCHG instructions and implementations described herein can be utilized in other capacities as well and need not be limited to the function of controlling the access to a shared memory space. For example, the VCMPXCHG instructions may be used for speculative execution in which a SIMD operation is performed on a plurality of data elements, the results of which are only written to the shared memory space if the data elements have not been modified by another agent during the operation. Accordingly, other embodiments are within the scope of the following claims.

What is claimed is:

1. A method comprising:
    decoding by a decoder in a processing device, a single vector compare-and-exchange instruction that includes a first storage operand that references a first storage location, a second storage operand that references a second storage location, and a third storage operand that references third storage location, the single vector compare-and-exchange instruction to perform a read-modify-write operation for the first storage location, the second storage location, and the third storage location;
    issuing the single instruction for execution by an execution unit in the processing device; and
    responsive to the execution of the single instruction, performing the read-modify-write operation including:
        copying an initial value that is stored in the first storage location, into the second storage location;
        storing a replacement value in the third storage location, wherein the replacement value differs from the initial value;
        comparing a present value that is presently stored in the first storage location, to the initial value that is stored in the second storage location to determine whether the present value is the same as the initial value;
        replacing the present value in the first storage location with the replacement value responsive to determining that the present value is the same as the initial value; and
        leaving the present value in the first storage location responsive to determining that the present value differs from the initial value.

2. The method of claim 1, wherein the single vector compare-and-exchange instruction further specifies a mask storage location that stores a plurality of mask elements corresponding to respective data elements in the first storage location.

3. The method of claim 2, wherein comparing the present value that is presently stored in the first storage location, to the initial value that is stored in the second storage location comprises comparing a first data element in the first storage location to a corresponding first data element in the second storage location when a mask element corresponding to the first data element in the first storage location is active.

4. The method of claim 2, wherein replacing the present value in the first storage location with the replacement value comprises replacing a first data element from the first storage location with a corresponding first data element from the third storage location when a mask element corresponding to the first data element from the first storage location is active.

5. The method of claim 1, further comprising replacing the initial value in the second storage location with the present value responsive to determining that the present value differs from the initial value.

6. The method of claim 5, wherein the single vector compare-and-exchange instruction further specifies a mask storage location that stores a plurality of mask elements corresponding to respective data elements in the first storage location.

7. The method of claim 6, wherein comparing the present value that is presently stored in the first storage location, to the initial value that is stored in the second storage location comprises comparing a data element from the first storage location to a corresponding data element in the second storage location when a mask element corresponding to the data element from the first storage location is active.

8. The method of claim 6, wherein replacing the present value in the first storage location with the replacement value comprises replacing a data element from the first storage location with a corresponding data element from the third storage location when a mask element corresponding to the data element from the first storage location is active.

9. The method of claim 6, wherein replacing the initial value in the second storage location with the present value comprises replacing a data element from the second storage location with a corresponding data element from the first storage location when a mask element corresponding to the data element from the first storage location is active.

10. A processor comprising:
    storage configured to store a first plurality of data elements at a first storage location, a second plurality of data elements at a second storage location, and a third plurality of data elements at a third storage location, each of the second and third plurality of data elements corresponding to a respective one of the first plurality of data elements;
    a decoder configured to decode a single instruction including a first storage operand that references the first storage location, a second storage operand that references the second storage location, and a third storage operand that references the third storage location and specifying a vector compare-and-exchange operation for the first storage location, the second storage location, and the third storage location; and
    an execution unit to:
        receive decoded instructions of the single instruction; and
        execute the decoded instructions of the single instruction to:
            copy an initial value stored in the first storage location, into the second storage location;
            store a replacement value in the third storage location, wherein the replacement value differs from the initial value;
            compare a present value that is presently stored in the first storage location, to the initial value that is stored in the second storage location to determine whether the present value is the same as the initial value;
            replace the present value in the first storage location with the replacement value responsive to a first determination that the present value is the same as the initial value; and
            leave the present value in the first storage location responsive to a second determination that the present value differs from the initial value.

11. The processor of claim 10, wherein the execution unit is further to replace at least one data of the second plurality of data elements with the corresponding data element of the first plurality of data elements responsive to the second determination that the present value differs from the initial value.

12. The processor of claim 11, wherein the single instruction further specifies a mask storage location that stores a plurality of mask elements corresponding to respective data elements in the first plurality of data elements.

13. The processor of claim 12, wherein the execution unit is to compare corresponding data elements from the first and second plurality of data elements when a respective mask element is active.

14. The processor of claim 12, wherein the execution unit is to replace the data elements from the first plurality of data elements with corresponding data elements from the third plurality of data elements responsive to the first determination that the present value is the same as the initial value when a respective mask element is active.

15. The processor of claim 12, wherein the execution unit is to replace data elements from the second plurality of data elements with corresponding data elements from the first plurality of data elements responsive to the second determination that the present value differs from the initial value when a respective mask element is active.

16. The processor of claim 10, wherein the execution unit is to execute the decoded instructions of the single instruction as an atomic operation.

17. The processor of claim 12, wherein the execution unit is further to:
set a flag if a match exists between each pair of corresponding data elements for which a corresponding mask element is active; and
clear the flag if the match does not exist.

18. A system comprising:
a memory controller coupled to a first storage location configured to store a first plurality of data elements; and
a processor coupled to the memory controller, the processor comprising:
a register file configured to store a second plurality of data elements, and a third plurality of data elements, each of the second and third plurality of data elements corresponding to one of the first plurality of data elements;
a decoder configured to decode a single instruction that includes a first storage operand associated with the first plurality of data elements, a second storage operand associated with the second plurality of data elements, and a third storage operand associated with the third plurality of data elements, the single instruction specifying a vector compare-and-exchange operation for the first, second, and third plurality of data elements; and
an execution unit coupled to the decoder to receive decoded instructions and coupled to the first storage location and the register file to execute the vector compare-and-exchange operation, wherein the execution unit is to:
copy an initial value that is stored in the first plurality of data elements into the second plurality of data elements;
store a replacement value in the third plurality of data elements, wherein the replacement value differs from the initial value;
compare corresponding data elements from the first and second plurality of data elements to determine whether at least one of the first plurality of data elements matches at least one of the second plurality of data elements, wherein the first plurality of data elements stores a present value;
responsive to a first determination that a match exists, replace data elements that match from the first plurality of data elements with corresponding data elements from the third plurality of data elements; and
responsive to a second determination that a match does not exist, replace data elements from the second plurality of data elements with corresponding data elements from the first plurality of data elements.

19. The system of claim 18, wherein the single instruction further includes a mask operand associated with a mask register that stores a plurality of mask elements corresponding to respective data elements in the first plurality of data elements.

20. The system of claim 19, wherein the execution unit is to compare pairs of corresponding data elements from the first and second plurality of data elements when a respective mask element is active, to set a flag if each comparison results in a match, and to clear the flag if each comparison does not result in a match.

21. The system of claim 18, wherein the execution unit is to execute the vector compare-and-exchange operation as an atomic operation.

22. A non-transitory computer-readable medium having stored thereon instructions operable to cause a processor device to:
decode a single instruction specifying a vector compare-and-exchange operation for a plurality of data elements, each data element having a corresponding test element, replacement element, and mask element, wherein the single instruction includes a first storage operand that specifies the plurality of data elements, a second storage operand that specifies a plurality of test elements, a third storage operand that specifies a plurality of replacement elements and a fourth storage operand that specifies a plurality of mask elements;
copy an initial value that is stored in the plurality of data elements into the plurality of test elements;
store a replacement value in the plurality of replacement elements, wherein the replacement value differs from the initial value;
compare each of the plurality of data elements to a corresponding test element if a respective mask is active, wherein the plurality of data elements stores a present value;
responsive to an indication that all comparisons indicate a match, set a flag and replace compared data elements with corresponding replacement elements, wherein the plurality of replacement elements stores the replacement value; and
responsive to an indication that at least one comparison does not indicate a match, clear a flag and replace compared test elements with corresponding data elements.

* * * * *